United States Patent
Edlund et al.

(10) Patent No.: US 6,603,489 B1
(45) Date of Patent: Aug. 5, 2003

(54) ELECTRONIC CALENDARING SYSTEM THAT AUTOMATICALLY PREDICTS CALENDAR ENTRIES BASED UPON PREVIOUS ACTIVITIES

(75) Inventors: Stefan B. Edlund, Sunnyvale, CA (US); Daniel Alexander Ford, Los Gatos, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,420

(22) Filed: Feb. 9, 2000

(51) Int. Cl.[7] ............................................. G06F 19/60
(52) U.S. Cl. ................. 345/780; 345/812; 345/963; 715/507; 705/9
(58) Field of Search ........................... 345/780, 808, 345/809, 810, 811, 812, 816, 817, 822, 963, 708; 705/8, 9, 10; 715/507

(56) References Cited

U.S. PATENT DOCUMENTS

| | | | |
|---|---|---|---|
| 5,283,856 A | | 2/1994 | Gross et al. |
| 5,621,903 A | * | 4/1997 | Luciw et al. ............... 345/708 |
| 5,818,437 A | * | 10/1998 | Grover et al. .............. 345/811 |
| 6,199,079 B1 | * | 3/2001 | Gupta et al. ................ 715/507 |
| 6,232,970 B1 | * | 5/2001 | Bodnar et al. .............. 345/708 |
| 6,327,574 B1 | * | 12/2001 | Kramer et al. ................ 705/10 |

* cited by examiner

*Primary Examiner*—John Cabeca
*Assistant Examiner*—Larry Anderson
(74) *Attorney, Agent, or Firm*—Lacasse & Associates; Randy W. Lacasse LLC; Alison Mortinger, Esq.

(57) ABSTRACT

An electronic calendaring system that automatically predicts calendar entries based upon previous activities. The system presents a user with an intelligent sequence of forms which query the user about events such as hotels for travel, attendees for meeting, etc. The initial information contained within the forms is generated by looking at previous records generated by the user; or in the case of a first time use, either selected defaults or blanks for data entry. Furthermore, the system automatically presents the user with an option to select a new activity or maintain the previous one. By presenting a structured sequence of appropriate forms and event history, the calendaring system simplifies planning for the user, or refreshes the user's memory, thereby intelligently assisting the user in the entry of event data.

9 Claims, 4 Drawing Sheets

New Calendar Event

400

| | |
|---|---|
| Start Date | 12/18/1999 |
| End Date | 12/23/1999 |
| Summary | Java conference |
| Category | Business ▼ |
| Type | Conference ▼ |

[ Next ] [ Cancel ]

Figure 4a

Conference
Travel Destination

| New York ▼ |
|---|
| Local |
| New York |
| Los Angeles |
| Dallas |
| Boston |
| Cabos San Lucas |

[ Next ]

[ New Destination ]

Figure 4b

Please fill out this information for your trip to New York:

| Preferred Airline: | American Airlines ▼ | [ Book ] |
|---|---|---|
| Hotel: | Hilton ▼ | [ Book ] |
| Rental Car: | Hertz ▼ | [ Book ] |
| Final destination | New York Convention Center ▼ | |

[ Done ] [ Cancel ]

Figure 4c

ELECTRONIC CALENDARING SYSTEM THAT AUTOMATICALLY PREDICTS CALENDAR ENTRIES BASED UPON PREVIOUS ACTIVITIES

BACKGROUND OF THE INVENTION

1. Field of Invention

The present invention relates to an electronic calendaring system. More particularly, the present invention relates to an iterative system and method for assisting a user when entering information related to a new calendar event.

2. Discussion of Prior Art

An electronic calendaring system is designed to maintain useful information for a user. The system allows maintenance of a personal schedule of activities such as keeping up with meetings and events; maintaining a to-do list; creating notes and memos; keeping up with special events and holidays; sharing calendar and schedule meetings with others; responding to invitations for events created by others; and maintaining information pertinent to events that have long expired.

Absent from the prior art electronic calendaring systems is a method of relating past event histories to the entry of future events. If a user was going to attend a conference in New York and had attended the same conference last year, it would be useful if the information previously entered in their electronic calendar was readily available without searching back through the calendar. In the past, the structured information entered in their electronic calendar was typically discarded and not reused. What is therefore needed is an interactive system and method for assisting a calendar user through the use of prior historical choices.

Systems have been developed for associating events in general. For example, U.S. Pat. No. 5,283,856, issued to Gross et al., discloses an event-driven rule-based messaging system and a conditional rule-based messaging system which is transparently implemented for use in electronic mail applications. Particular events may be associated with a specific mail message, and/or rule(s), to promote efficient mapping of messages, events, and rules, so that only rules which monitor a specific event are invoked upon occurrence of the event. However, this patent makes no mention of intelligently guiding the user by producing a contextual-based sequence of entry templates with historically predictable entries based upon previous activities.

Other systems are known which provide basic default entry selections used in filling in various data fields. Known systems include: Quicken's "Quickfill"™ function which fills in a previous entry as a default; Microsoft Money ™ associates categories with previous expenses, and Microsoft Intellisense™ which provides a drop-down list of sites visited earlier when browsing the Web (WWW) as well as non-contextbased automatic form completion. However, as with the Gross et al. reference, these references make no mention of intelligently guiding the user by producing a contextual-based sequence of entry templates with historically predictable entries based upon previous activities.

The prior art fails to include the above noted features as well as other benefits described, illustrated and claimed hereafter.

SUMMARY OF THE INVENTION

The instant invention presents the user with an intelligent sequence of forms which query the user about events (hereinafter, event and activity will be used in the specification interchangeably) such as hotels for travel, attendees for meeting, etc. The initial information contained within the forms is generated by looking at previous records generated by the user; or in the case of a first time use, either selected defaults or blanks for data entry. Furthermore, the system automatically presents the user with an option to select a new activity or maintain the previous one. By recalling this event history, the calendaring system simplifies planning for the user, or refreshes the user's memory.

Business travelers, for example, frequently revisit the same location many times. When a location is revisited, it is useful to bring back information such as "what hotel did an individual stay at last time?", or "how did an individual get from the airport to his/her destination". Such information is automatically derived by looking at past events in the user's own calendar. A forms repository contains many event entry templates to assist the user in data entry. The present invention intelligently selects and sequences the best forms to create a fully usable structured entry sequence for event information.

BRIEF DESCRIPTION OF THE DRAWINGS

FIGS. 4A–C illustrates a GUI of the present invention.

DESCRIPTION OF THE PREFERRED EMBODIMENTS

Figure 1:
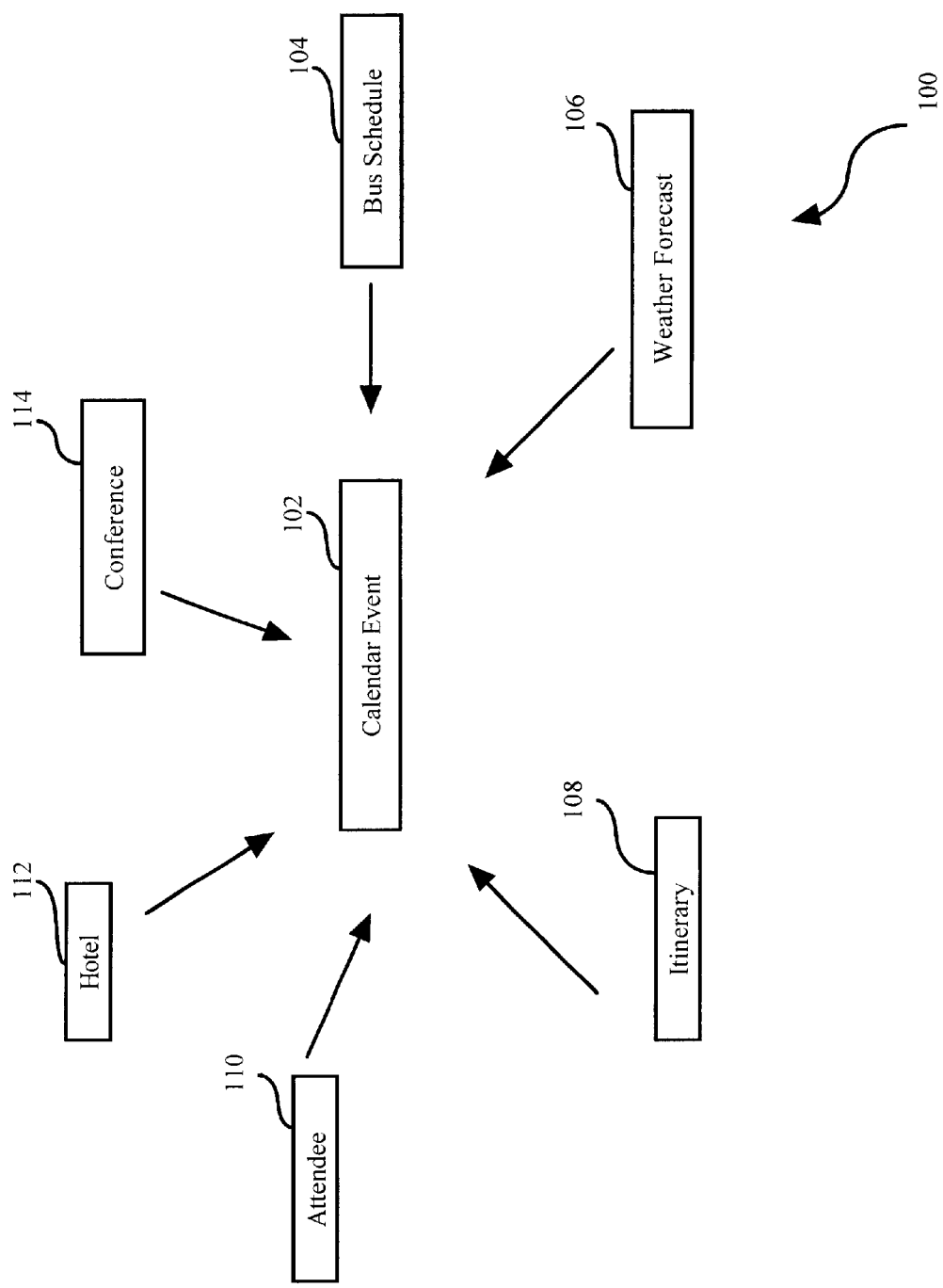
FIG. 1 illustrates interrelation of information associated with calendar event.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Referring now to the drawings, FIG. 1 illustrates the general interrelation 100 of information associated with a calendar event 102. A calender event represents an entry into an electronic calendar such as an upcoming meeting or trip. Possible sources of input information to a calendar event 102 include such examples as a: bus schedule 104, weather forecast 106, itinerary 108, attendee 110, hotel 112, conference 114, etc. In the prior art, such information is typically entered in an unstructured manner making retention of this information for future use difficult, if not impossible.

Figure 2:
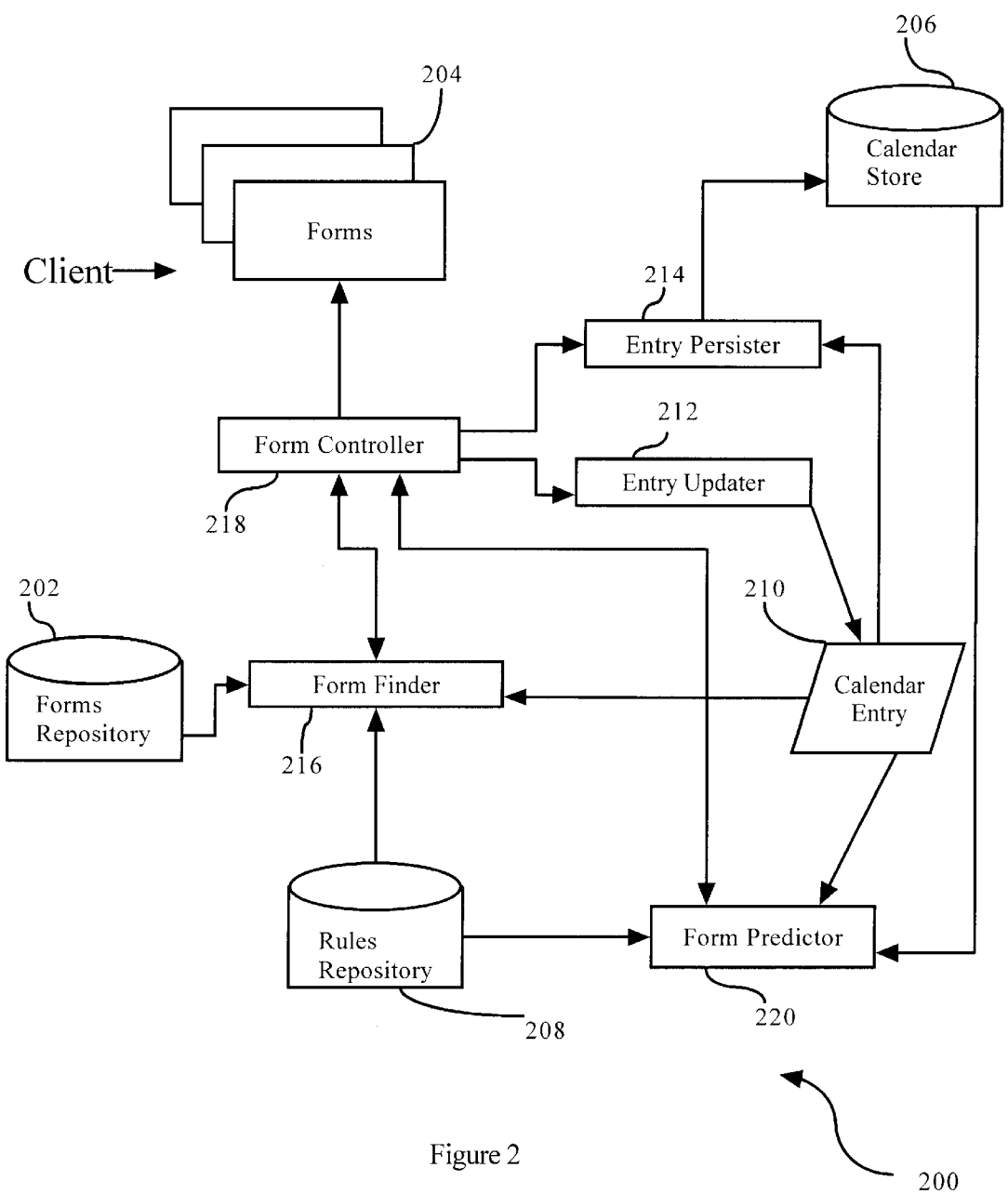
FIG. 2 illustrates an overview of the system architecture.

FIG. 2 illustrates a schematic overview of the inventive system architecture 200 that automatically predicts calendar entries based upon previous activities. The system comprises forms repository 202, forms 204, calendar store 206, rules repository 208, calendar entry 210, entry updater 212, entry persister 214, form finder 216, form controller 218, and form predictor 220. Form repository 202 contains various data entry forms (templates) 204 displayed to the user to enable entry of information related to various events (also see examples shown in FIGS. 4a–4c). A form contains a unique identification and a number of named fields, some of which are hidden and never shown to the user. Hidden fields typically contain meta-data about the form, such as rules related to use or sequencing. For each named field, the system specifies an intelligently selected default value, or if no historical data is available, the field is left blank for the user to fill out.

A form contains any number of action buttons. Action buttons such as "Next", "Cancel", "Finish", "Done", etc. are selected by the user, e.g. with a computer mouse. When the user is finished entering information on the form and wants to complete the entry process, a selection of "finish" will produce any necessary additional forms or signal the completion of the event entry. An action button has associated rule(s) to decide which form to load next. The system intelligently selects sequential forms based upon information specified by the user on the current or previous forms.

Calendar store 206 contains calendar event entries for a plurality of calendar users, and information associated with their respective entries. Typically, the calendar store is implemented with a relational database in the back-end. Any known relational database can be used without departing from the scope of the present invention. Rules repository 208 contains a number of rules as described above to be used either by form finder 216 or form predictor 220. A rule contains three entities:(1)the identity of the form for which the rule belongs, (2) the name of the field on the form where the rules apply or the name of an action button, and (3) the query used to predict values for the field or used to retrieve a new form.

The query consist of two parts: Firstly, a pointer to the source on which the query is executed. This can be the user's calendar store 206, forms repository 202, or another user's calendar (if permission exists). The second part is the query string itself. Most commonly, if the calendar data were stored in a relational database, this would be a SQL query string. Examples of queries are "Which hotel(s) has an individual stayed at when traveling to New York?" or "Who were the attendees at an individual's project xyz meetings?" If multiple results are returned by the query, they are sorted in order of relevance. For example, a meeting that took place two weeks ago could be ranked higher than a meeting 6 months ago. A hotel that has frequently been used is ranked higher than a hotel used only once or twice, etc. The relevance order is determined by the query itself, for instance using "ORDER BY" SQL statements. Similarly, a query is used to retrieve forms 204 from the form repository 202.

Calendar entry 210 is stored in a temporary volatile memory location which temporarily stores all information related to a new entry, therefore, if the user decides to cancel the creation of the new event, calendar store 206 need not be updated. Entry updater 212 transfers information entered by the user (calendar entry 210) into a temporary volatile memory, and if this is the last form, control is passed to entry persister 214. The entry persister stores all information related to the calendar entry in persistent storage, i.e. calendar store 206.

Form finder 216 finds and loads a form from forms repository 202. Rules repository 208 decides how to proceed from one form to the next. If this is the first form loaded, no rule is specified and the default "new calendar entry" form is displayed. For subsequent forms, depending upon which action button the user selects on the previous form, the rule associated with the action is loaded. The query for the rule is instantiated and executed, and the result of the query specifies which form should be loaded next. In operation, form controller 218 instructs form finder 216 to retrieve a form from forms repository 202. Such a form is passed to form predictor 220 (to be discussed later), which provides default values for fields on the form. Furthermore, form controller 218 renders the form to the calendar user so that the user is able to enter information related to the new event on a displayed version of the form or accept the default values predicted by the system. As discussed previously, the system stores information entered by the user in a volatile memory ,not shown, as a copy of the new event and if this is the last form, the new calendar event is stored persistently in calendar store 206. Continuing in the system overall operation, form predictor 220 uses information entered for the new event to guess probable values for one or more fields on the form. The form predictor 220 does this by looking at previous event information stored in calendar store 206. Some fields in the form have rules associated with them as discussed earlier. For each field in the form, form predictor 220 retrieves a rule from rules repository 208 (if it exists). Each rule has an associated query which specifies how to retrieve a list of possible values for that event. This query is initiated with the information entered for the new calendar event on previous forms and then executed. The result of the query is used as default values for the field, with the most probable value pre-selected. Finally, the modified form is sent back to form controller 218 to be rendered to the user who accepts or modifies the predicted values as desired.

Figure 3:
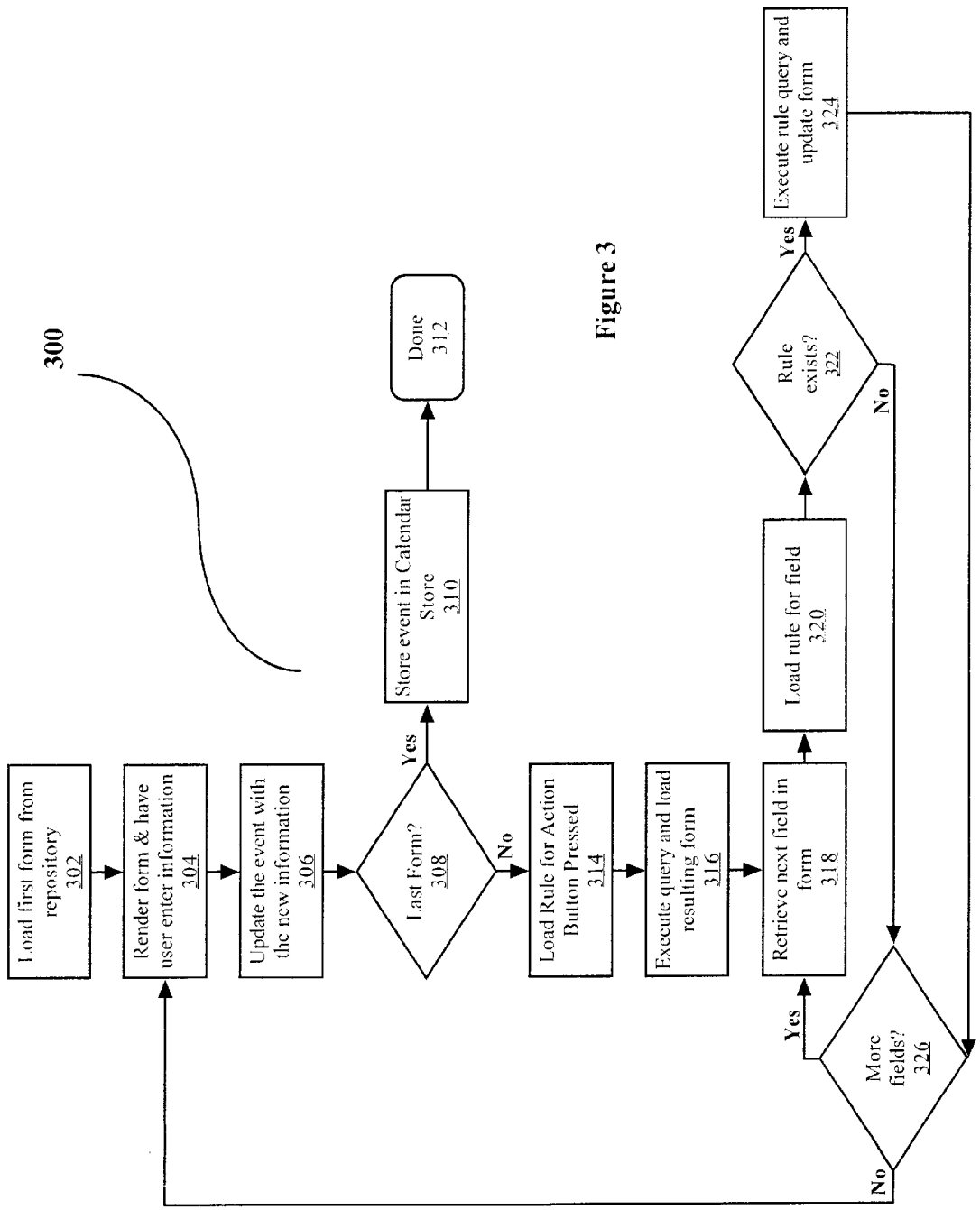
FIG. 3 illustrates a flow diagram for creating a new event.

Referring to FIG. 3, a flow diagram illustrates steps for creating a new event 300. The system loads a first form 204 (FIG. 2) from form repository 202 (FIG. 2) in step 302, the system then proceeds to render such form to the user and prompts the user to enter information in step 304. In step 306, the system updates the event with the new information entered by the user or maintains a displayed default predicted by the system based on previous knowledge. From a sequence of forms, if the form presented to the user is the last form in step 308, then the system stores the event in calendar store 206 (FIG. 2) as in step 310 and the flow is complete 312. Referring back to step 308, if the form presented is not the last form, then the system loads the rule for an action button which was selected by the user 314. In step, 316, the system executes a query and loads the resulting form. In step 318, the next form is retrieved; rule loaded for fields 320 and a determination is made whether a rule exists 322. If a rule exists, step 324 executes a rule query, updates the form and determines if more fields exist 326—repeating loop 318–324 for more fields and returning to 304 otherwise. If no rule exists in step 322, the flow continues directly to 326 and continues as described above.

FIG. 4 illustrates a sequence of screenshots 400 of forms 204 (FIG. 2) as illustrated on a typical display used to assist an individual in entering a potential travel event into the individuals's calendar. FIG. 4a shows a first data entry template for a new event in the present invention electronic calendar system. In the example shown, a user will attend a Java conference. The system displays the template requesting information such as start, end, event description/summary, category such as business, etc. and type, such as conference, etc. The individual categorizes the event as business related, and the type of event as "Conference". This information causes the system to generate the screenshot entitled "Conference Travel Destination" shown in FIG. 4b, where the individual is presented with a list of possible travel destinations that the system has previous knowledge. The list is stored in order of probability and/or on earlier responses, e.g., most conferences are local, therefore local is the first selection followed by New York, LA, etc. After having selected a destination, the system prompts the individual to fill in extra information related to the business trip as shown in the form of FIG. 4c. Again, as before, the information defaults are generated by looking at previous travel records for the individual; such information as airline, hotel and rent a car. In this case, the individual is also presented with an option to reserve tickets, hotels etc. online. For each selection the user is given the option of taking the displayed default, another known entry from a drop-down menu or enter a new possible alternative.

CONCLUSION

A system and method has been shown in the above embodiments for the effective implementation of an electronic calendaring system that provides an intelligent sequence of event entry templates which have automatic prediction of calendar entries based upon previous activities. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program,computing environment, specific computing hardware. In addition, the specific chosen predictions methods are representative of the preferred embodiment and should not limit the scope of the invention.

The present invention can be implemented locally on a single PC, connected workstations (i.e. networked-LAN), across extended networks such as the Internet or using portable equipment such as laptop computers or wireless equipment (RF, microwaves, infrared, photonic, etc.) The above described functional elements are implemented in various computing environments. For example, the present invention may be implemented on a conventional IBM PC ®, Macintosh ®, UNIX ® or equivalent, single, multi-nodal (e.g. LAN) or networking system (e.g. Internet, WWW). All programming, GUIs, display panels and dialog box templates, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of programming.

What is claimed is:

1. A system to intelligently assist a user in the entry of event data in an electronic calendaring system comprising:
    a calendar store, said calendar store retaining calendar entries associated with one or more users;
    a graphical user interface, said interface displaying to a user one or more forms requesting event data calendar entries for one or more fields;
    a forms repository storing said forms in computer storage;
    a forms controller selectively retrieving said one or more forms;
    a rules repository, said rules repository operatively determining said selectively retrieving of said forms and default and historical event entries, and
    said system intelligently assisting a user in the entry of calendar data in said electronic calendaring system based on a rules-based sequence of forms and suggested default and historical event data entries.

2. An system to intelligently assist a user in the entry of event data in an electronic calendaring system, as per claim 1, wherein said form controller further processes new event entries as possible new historical event entries upon completion of an event entry.

3. An system to intelligently assist a user in the entry of event data in an electronic calendaring system, as per claim 1, wherein said default and historical event entries are organized and displayed to encourage selection of a most probable event entry.

4. A system to intelligently assist a user in the entry of event data in an electronic calendaring system, as per claim 3, wherein said intelligently assisting a user in the entry of calendar data comprises a form predictor, said form predictor utilizing previous calendar entry inputs and rules in said rules repository to predict said default values for said fields.

5. A system to intelligently assist a user in the entry of event data in an electronic calendaring system, as per claim 1, wherein said system further comprises an entry updater for temporarily storing any calendar entry inputs.

6. A system to intelligently assist a user in the entry of event data in an electronic calendaring system, as per claim 1, wherein said system further comprises an entry persister for permanently storing any calendar entry inputs.

7. A system to intelligently assist a user in the entry of event data in an electronic calendaring system comprising:
    a calendar store, said calendar store retaining calendar entries associated with one or more users;
    a graphical user interface, said interface rendering one or more forms, with at least one form having one or more fields for calendar entry inputs;
    a forms repository storing said forms in computer storage;
    a forms controller selectively retrieving one or more forms for rendering in said interface, said retrieval based upon one or more rules;
    a form predictor, said form predictor utilizing previous calendar entry inputs and one or more rules associated with said fields to predict a list of probable values for said fields;
    a rules repository, said rules repository storing said rules for selectively retrieving forms and said rules for predicting said list of probable values, and
    wherein said system intelligently assists a user in the entry of event data in said electronic calendaring system based on said rules in said rules repository.

8. A system to intelligently assist a user in the entry of event data in an electronic calendaring system, as per claim 7, wherein at least one of said fields is a hidden field.

9. A system to intelligently assist a user in the entry of event data in an electronic calendaring system, as per claim 8, wherein said at least one hidden field comprises meta-data about said forms.

* * * * *